(12) United States Patent
Durif

(10) Patent No.: US 7,971,614 B2
(45) Date of Patent: Jul. 5, 2011

(54) SYSTEM FOR LOCKING A MOUNTING RING ON A VEHICLE HUB

(75) Inventor: Pierre Durif, Enval (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 11/887,894

(22) PCT Filed: Mar. 27, 2006

(86) PCT No.: PCT/EP2006/061058
§ 371 (c)(1),
(2), (4) Date: Nov. 11, 2008

(87) PCT Pub. No.: WO2006/106053
PCT Pub. Date: Oct. 12, 2006

(65) Prior Publication Data
US 2009/0152935 A1 Jun. 18, 2009

(30) Foreign Application Priority Data

Apr. 5, 2005 (FR) ........................ 05 03395

(51) Int. Cl.
*B60C 7/24* (2006.01)
*B60B 25/00* (2006.01)
(52) U.S. Cl. ...... 152/409; 152/410; 301/11.1; 301/95.11
(58) Field of Classification Search ............... 301/10.1, 301/11.1–11.3, 95.11; 152/375, 386–388, 152/396, 402, 405–406, 409–410
See application file for complete search history.

(56) References Cited

U.S. PATENT DOCUMENTS

| | | | | | |
|---|---|---|---|---|---|
| 1,646,863 | A | * | 10/1927 | Hunt | 301/10.1 |
| 2,736,610 | A | * | 2/1956 | Waite | 301/37.42 |
| 2,884,984 | A | * | 5/1959 | Riggs | 152/410 |
| 2,895,526 | A | * | 7/1959 | Mueller | 152/410 |
| 2,929,431 | A | * | 3/1960 | Mueller | 152/410 |
| 3,118,485 | A | * | 1/1964 | Le Jeune | 152/410 |
| 3,623,530 | A | * | 11/1971 | Beyers et al. | 152/410 |
| 3,783,927 | A | * | 1/1974 | Verdier | 152/409 |
| 4,995,673 | A | * | 2/1991 | DuBost | 301/37.36 |
| 5,086,821 | A | * | 2/1992 | Russell et al. | 152/410 |
| 5,890,526 | A | * | 4/1999 | Taylor | 152/410 |
| 6,631,747 | B2 | * | 10/2003 | Durif | 152/409 |
| 6,786,259 | B2 | * | 9/2004 | Vehar et al. | 152/410 |
| 2009/0039697 | A1 | * | 2/2009 | Durif | 301/35.3 |

FOREIGN PATENT DOCUMENTS

| | | |
|---|---|---|
| FR | 2 087 770 | 12/1971 |
| GB | 1304132 | 1/1973 |
| WO | WO 00/71365 | 11/2000 |
| WO | WO 03/064183 | 8/2003 |

* cited by examiner

*Primary Examiner* — Jason R Bellinger
(74) *Attorney, Agent, or Firm* — Cohen Pontani Lieberman & Pavane LLP

(57) ABSTRACT

A locking system for a ring for mounting on a hub of a vehicle, the mounting ring being intended to receive a bead of a tire in an assembly for mounting the tire on the hub of a vehicle. The locking system comprises a locking ring and a polymeric insert.

21 Claims, 5 Drawing Sheets

SYSTEM FOR LOCKING A MOUNTING RING ON A VEHICLE HUB

RELATED APPLICATION

This is a U.S. National Stage of International Application No. PCT/FR2006/061058 filed on Mar. 27, 2006.

This patent application claims the priority of French patent application no. 05/03395 filed Apr. 5, 2005, the disclosure content of which is hereby incorporated by reference.

FIELD OF THE INVENTION

The invention relates to a locking system for a ring for mounting on a rim of a wheel, the mounting ring being intended to receive a bead of a tire, particularly of the "tubeless" type, that is to say a tire that has no separate air chamber.

A mounting assembly such as this is more particularly intended to be fitted to heavy vehicles of the earth-moving and construction vehicle type for example, such as those used in mines.

BACKGROUND OF THE INVENTION

The customary embodiments of running gear are of two types as far as the wheel rims are concerned. They are produced either with what are known as drop-center rims, which have tapered bead seats inclined by an angle of 5° or 15° with respect to the axis of rotation of the assembly, or with flat or practically flat base rims which have bead seats inclined either by 0° or by 5° with respect to the axis of rotation.

Drop-center rims have a mounting groove the diameter of which is markedly smaller than the nominal diameter of the rim. This internal diameter of the rim is considered by users to be too small because it does not, for example, allow brake drums to be selected that are of a size suited to effective braking of wheels which are becoming increasingly powerful with respect to their weight.

As a result, the rims are commonly used for mounting and running, for example, tires of passenger wheels and/or heavy goods wheels, but are used far less, if at all, for other types of wheels such as, for example, earth-moving and construction equipment.

In order to fit tires, particularly tires of the tubeless type, a flat base rim requires there to be at least one removable lateral ring, a locking ring and a seal, and obviously the base of the rim to have a fixed flange on the opposite side to the side on which the parts are removable. This is because the dimensions of the wheels of the vehicles and the dimensions of the tires, particularly the stiffness of the lower regions, entail producing the wheels in multiple parts so as to allow the tire to be mounted on a rim. It is therefore necessary to have at least three parts. In most cases, the number of parts needed is greater than three and may sometimes be as many as six parts for large-sized tires, not including the parts needed to fix the wheels to the vehicle. With the exception of the seals which are made of rubber, the parts of a wheel rim are made of metal and are therefore heavy, bulky and difficult to handle. It therefore follows that mounting and removing large and very large tires are difficult and lengthy operations. Fitting and/or removing a wheel equipped with such a tire involves laying up the wheel or the equipment for a length of time that is rather considerable and therefore prejudicial to the desired productivity in the use of these wheels.

Patent Application WO 00/71365 describes a technique that allows the mounting of tires to be simplified, these tires being mounted directly on the hub which then acts as a rim. Independent mounting rings act as the bead seats and are held in place by lock rings which can be secured to the rim using, in particular, complementary profiles. With this technique, the locking ring is made up of a vulcanized rubber compound reinforced by and coated onto a reinforcing ring that is circumferentially elastic and radially resistant to compression.

A technique such as this is very advantageous because it makes it possible to eliminate the phases of mounting onto a rim and of fixing a wheel to the vehicle, the tires being mounted directly onto the rim via the mounting rings and locking rings. Furthermore, since the number of elements is greatly reduced, the phases involved in handling these elements become simpler.

Tests conducted on this type of technique have revealed the fact that the locking ring, which, aside from its function of locking the system, is an element involved in the transmission of braking or driving torque, undergoes loading which causes it to wear. The locking ring which, at its surface, exhibits a rubber compound in order to give it elasticity and provide control over the coefficients of friction, particularly between the rim of the wheel and the locking ring, therefore in use is subjected to wearing of its outer part which comes into contact with the rim on the one hand, and a mounting ring on the other hand, both of these being made of metal. This wear results in the need to change the locking ring each time the tire is changed. The complex nature of this element which is made up of a rubber compound coating an annular reinforcing element that is resistant to compression and the need to change it periodically leads to additional costs that must be borne by the user.

SUMMARY OF THE INVENTION

One object of the present invention is to improve the technique disclosed in document WO 00/71365 and, in particular, of limiting the costs associated with operating and maintaining this technique.

This objective has been achieved according to one embodiment of the invention using a locking system for a ring for mounting on a rim of a wheel, the mounting ring being intended to receive a bead of a tire in an assembly for mounting the tire on the rim of a wheel, the locking system consisting of a locking ring and a polymeric insert intended to be placed between the rim and the locking ring.

A polymeric insert must be understood to mean an insert consisting essentially and, in particular, for the most part, of at least one polymer compound.

The polymer compound is advantageously a compound containing vulcanized rubber, that is to say a blend of elastomer(s), reinforcing fillers and additives, all of which are well known, that is then vulcanized at a certain temperature.

The polymeric insert advantageously has a secant elastic modulus of at least 1 MPa under a relative elongation of 10%, making it possible in particular for it to be placed on the rim more easily.

Limitation in torque transfer between the rim and the tire could be ascribed to slippage between the rim and the locking system of the mounting ring. Specifically, studies consisting in reducing the friction coefficients of the materials have shown that the slippage was essentially observed at the point of contact between the locking ring and the rim. This effect may in particular be explained by the mean radius of the contact zone between the rim and the locking ring being less than the mean radius of the contact zone between the locking ring and the mounting ring. This difference in mean radius, and consequently difference in contact area, and hence difference in friction surface between the various torque transfer regions, is compensated for in accordance with the invention by an appropriate choice of the friction coefficients and in particular by the use of a polymeric insert between the rim and the locking ring.

The locking system thus produced according to the invention makes it possible, in particular during a tire change, to change at the same time the polymeric inserts each associated with the locking rings, which may be damaged, but to keep the locking rings for a new use.

According to a preferred embodiment of the invention, the locking ring is made of an incompressible material.

A ring that is said to be incompressible or radially resistant to compression must be understood to mean a ring in which the maximum radial dimension of its transverse section, that is to say the longest radial distance between two points on the contour of the section and situated on a normal to the axis of rotation of the rim, is reduced under load by 2% at most. For example, the ring can be a metal ring.

An incompressible locking ring may a priori be used throughout the lifetime of the wheel.

The locking ring is advantageously circumferentially elastic. A ring that is said to be circumferentially elastic must be understood to mean a ring in which the circumferential development is capable of lengthening by at least 3% under a load of 50 daN at most, and of returning to its initial state when the load is removed. The locking ring thus allows simplified handling for fitting it in the mounting assembly, while at the same time gripping the polymeric insert and the rim of the wheel.

The circumferential direction, or longitudinal direction, of the tire is the direction corresponding to the periphery of the tire and defined by the direction in which the tire runs.

The transverse or axial direction of the tire is parallel to the axis of rotation of the tire.

The radial direction is a direction intersecting the axis of rotation of the tire and perpendicular thereto.

The axis of rotation of the tire is the axis about which it rotates under normal use.

A radial or meridian plane is a plane containing the axis of rotation of the tire.

The circumferential meridian plane or equatorial plane is a plane perpendicular to the axis of rotation of the tire and which splits the tire into two halves.

According to one advantageous embodiment of the invention, the locking ring consists of a collection of several, preferably identical, individual elements joined together to form the ring. An embodiment such as this in particular allows for simplified handling and simplified transportation of the locking ring since the individual elements can be handled independently of one another.

Advantageously too, each individual element is such that it corresponds to a sector representing between 5 and 60° of the locking ring when the latter is in place in the assembly for mounting the tire on the rim of the wheel. The locking ring, when fitted in the assembly for mounting a tire on a rim, fits partially into a recess made on the rim. This recess has an axially outer part which exhibits a slope which in particular allows the transmission of torque. The position of the locking ring can vary slightly in the axial direction along the slope of the recess while the tire is being mounted. An individual element representing a sector of between 5 and 60° can be produced with a longitudinal curvature such that the individual element does not damage the polymeric insert regardless of the position of the individual element along the slope of the recess, and therefore regardless of the radius at which it lies. Elements of longer length with a given curvature may, in certain positions, bear against the polymeric insert via their ends and therefore run the risk of damaging this envelope on account of high localized pressure. When the individual elements are made of metal, each individual element advantageously represents a sector of between 5 and 30°.

One preferred embodiment of the invention makes provision for the individual elements to be joined together by additional elements comprising elongating means associated with an elastic restoring force. An embodiment such as this allows the locking ring to be given some elasticity and thus allows the pressure to be distributed uniformly around the entire periphery of the element.

A locking ring according to the invention is considered to have at least two walls: a radially inner wall and a radially outer wall, the two walls possibly being connected by lateral walls that are practically perpendicular to the direction of the axis of rotation. The radially inner wall has a shape similar to the shape or profile of the recesses or grooves created on the rim of the piece of equipment in order to receive the rings. The recesses may, when viewed in meridian section, have any shape but preferably have a meridian section the surface of which is almost triangular with a base along the generatrix of the rim and with two sides making acute angles ranging between 10° and 45° with the direction parallel to the axis of rotation, the two sides being connected, at their opposite ends to the base, by a rounded vertex, so as to minimize stress concentrations and the risk of fatigue cracking. The quasi-height of the triangle, shortened by the rounded vertex on the base, preferably ranges between 10 and 45 mm. The radially inner wall of the locking ring in meridian section has a profile identical to the interior profile of the quasi-triangle described hereinabove.

The meridian section of the reinforcing ring of the locking ring, in its radially inner part, may be of any shape in as much as a substantial part of the maximum radial dimension of its meridian section lies inside the triangular section of the recess formed in the rim. The expression "substantial part" must be understood to mean a radial distance representing at least 25% of the maximum radial dimension of the section of the locking ring.

According to an alternative embodiment of the invention, the meridian section of the locking ring is, in its radially inner part, polygonal with at least two sides substantially parallel to the two sides of the triangular section of a recess made on the rim of the wheel, and at least 25% of the maximum radial dimension of the meridian section of the ring lies within the triangular section of the recess formed in the rim.

Advantageously, the meridian section of the locking ring is, in its radially outer part, polygonal with at least one tapered part the generatrix of which makes an angle that may range between 15° and 45° with respect to the direction of the axis of rotation. The tapered part will then, when the tire is being mounted, come to face the tapered part of the radially inner wall of the mounting ring on which the bead of the tire will be mounted.

In order to make the operations of removing the tire easier, the locking ring is advantageously equipped with and/or associated with a cord or strap, for example a metal one, allowing the ring to be dislodged from the recess in the rim by pulling on the cord.

According to a preferred embodiment, the polymeric insert extends in contact with the radially inner wall of the locking ring.

One advantageous embodiment of the invention provides for the polymeric insert to extend over the axially inner side wall of the locking ring. According to this embodiment, the insert in particular favours the fitting of the mounting ring by inflation by forming what is called a "primary" seal, which makes it possible to start the inflation.

Also advantageously, the polymeric insert includes an extension which is positioned beyond the radially outer end of the axially inner side wall of the locking ring. This extension of the polymeric insert forms a circumferential protuberance that forms a primary seal at the contact of the mounting ring before inflation and further facilitates inflation by forming the "primary" seal.

The mounting ring is an element, for example made of metal, made up of a rim seat, generally tapered but which could be cylindrical, or some other shape, the seat being extended axially and radially outwards by a rim flange, it being possible for the flange optionally to be independent of the seat and removable from the seat. The mounting ring advantageously has a radially inner wall formed of at least one tapered part the generatrix of which makes an angle ranging between 15° and 45° with the direction of the axis of rotation, while the radially outer wall, when viewed in meridian section, is made up, on the one hand, of a tapered generatrix forming an angle that may range between 0° and 16° with the direction of the axis of rotation and, on the other hand, extending the generatrix axially outwards via an arc of a circle, of the curve that represents the axially inner and radially outer profile of the rim flange. In all cases, the curve is advantageously situated radially on the outside and axially on the inside of a segment of straight line joining the point of intersection of the curve with the tapered generatrix mentioned hereinabove and that point on the curve that is furthest from the axis of rotation. Thus, the curve may be formed of an arc of a circle tangential to the arc of a circle connecting the tapered generatrix with the curve. It may also be formed of a segment of a straight line which may or may not be perpendicular to the axis of rotation, tangential radially on the inside to the above connecting arc and radially on the outside to a second arc of a circle so as to obtain the desired curve. The mounting rings may be independent of the tire and, more specifically, of the beads of the tire. To facilitate and speed up mounting and removal operations, and the various handling operations required, the mounting rings with seats and flanges form an integral part of the tire just as, for example, do the bead wires; the rings may be secured to the beads of the tire by press-fitting without the possibility of detachment. A principle such as this is described in Patent FR 2 087 770.

Whether or not they are secured to the beads of the tire, and with a view to allowing the elements that have to be fitted to be handled more easily, the mounting rings are advantageously equipped in their axially inner parts with a lifting system, for example of the type involving an airbag, which makes it possible to create and maintain, during fitting operations, a circumferentially constant gap between the rim and the radially inner part of the rings, hence greatly improving the latitude for axial movement. The 5 to 20 mm gap also has the purpose of allowing the tire/mounting ring assembly to be engaged by sight on the rim without binding. Another alternative embodiment of the invention for facilitating the fitting of the mounting rings, and of the locking rings and/or the tires, anticipates variations in diameter of the rim. With this alternative embodiment, the radial distance between the rim and the radially inner part of the rings and/or the beads of the tire is increased in those axial regions where contact is not required, that is to say in those regions where there are no recesses for receiving the locking rings.

BRIEF DESCRIPTION OF THE DRAWINGS

Other details and advantageous features of the invention will become apparent hereinafter from the description of an exemplary embodiment of the invention given with reference to FIGS. 1 to 5 which depict.

DETAILED DESCRIPTION OF THE DRAWINGS

For easy understanding, the figures are not drawn to scale.

Figure 1:
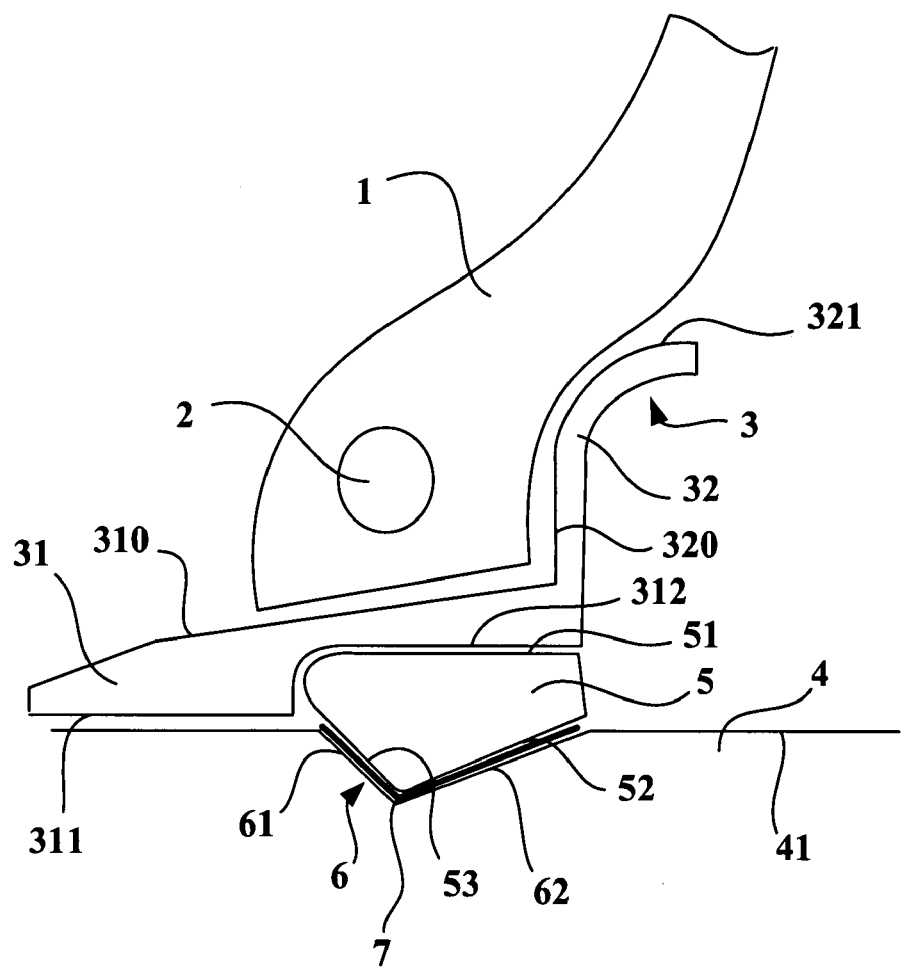
FIG. 1: a schematic depiction in meridian section of an assembly for mounting a tire on a rim according to the invention.

FIG. 1 shows only the bead 1 of a large tire intended to be fitted to a piece of construction equipment. The bead 1 is mainly reinforced by a bead wire 2 around which the radial carcass, not depicted in FIG. 1, of the tire is wound to anchor it. The bead 1 has radially inner and axially outer walls of shapes and sizes designed to be mounted on a mounting ring 3 made up of a tapered seat 31 of which the generatrix 310, viewed in meridian section, makes an angle of about 5° with the direction of the axis of rotation, this generatrix being extended axially outward by a wall 320 of a rim flange 32, the wall 320 being perpendicular to the direction of the axis of rotation and ending axially and radially on the outside in a rounded portion 321. As for the radially inner wall of the tapered mounting ring 3, it is formed of an essentially cylindrical first part 311 intended to sit on the cylindrical surface of a rim 4 and of a second part 312 intended to come into contact with the radially outer wall 51 of the locking ring 5, the wall 51 being of a shape that complements that of the wall 312. The locking ring 5 thus has a radially outer surface 51 intended to be in contact with the radially inner surface 312 of the mounting ring 3 and a radially inner surface formed of two generatrices 52, 53 which is inserted in a recess 6 of the rim 4, the shape of the recess 6 complementing the surface formed by the two generatrices 52, 53 of the locking ring 5. Upon assembly, the two generatrices 52, 53 come to bear against the two tapered generatrices 61, 62 of the recess 6 created in the rim 4, via a polymeric insert 7. The generatrices 61, 62 of the recess 6, with the continuation of the cylindrical generatrix 41 of the rim 4, form a triangle with two sides 61, 62 and a base of sufficient axial width that at least one third of the locking ring 5 lies inside the triangle defined above, thus, in conjunction with the shape of the recess 6 and the radially inner and outer shapes of the locking ring 5, providing enough axial retention to retain the ring 5 under all running conditions.

Figure 2:
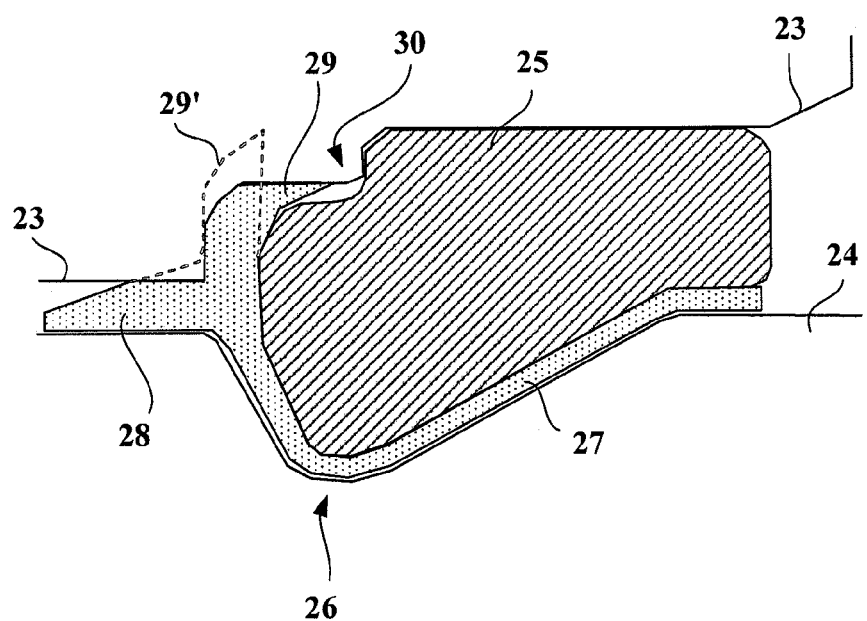
FIG. 2: a schematic depiction in meridian section of the locking system according to the invention.

FIG. 2 shows a locking system 20 consisting, on the one hand, of the locking ring 25 and, on the other hand, of the polymeric insert 27. The polymeric insert 27 of annular shape is inserted between the recess 26 provided for this purpose in the rim 24 and the locking ring 25.

In the case shown in FIG. 2, the insert 27 is provided with a part 28 bearing on a cylindrical part of the rim 24 so that said insert 27 is properly positioned. The part 28 of the insert 27 also has a tapered axially inner end in order to make it easier for the mounting ring 23 to pass.

The insert 27 also includes a positioning end 29 which radially extends to the outside of that part of the insert 27 which comes into contact with the axially inner side wall of the locking ring 25. Before fitting the mounting ring 23, this end of the insert 27 is advantageously in the position represented by the hatched zone 29'. This position 29' of this end of the insert 27 enables the "primary" seal in contact with the mounting ring 23 to be formed in order to initiate the inflation of the fitting assembly. The position 29 of this end is obtained during inflation, the mounting ring bearing on said insert 27.

The locking ring and the mounting ring may also have complementary shapes in an axially inner zone 30 allowing in particular an axial blocking function, preventing movement towards the outside of the mounting ring on the locking ring. This blocking function also makes it possible to limit the compression of the insert 27 in this zone 30. This blocking, possibly also combined with axially outward extension of the locking ring, may also help to control the positioning of the mounting ring along the radial and axial directions and in particular prevent any risk of non-uniform positioning around the wheel.

Figure 3:
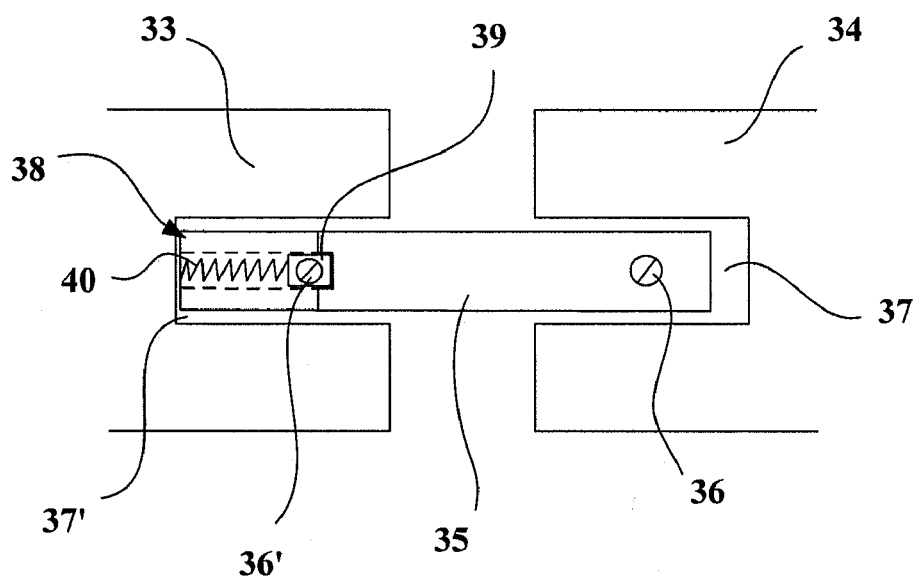
FIG. 3: a schematic depiction in circumferential section of part of the locking ring according to one embodiment of the invention.

FIG. 3 depicts part of a locking ring and, more specifically, two of the individual elements 33, 34 of which it is formed, the elements being connected by a connecting element 35.

The locking ring thus advantageously consists of a collection of several, preferably identical, individual elements 33, 34 joined together to form a reinforcing ring. This embodiment in particular allows for simplified handling and simplified transportation of the locking ring. The individual elements 33, 34 may be combined on site when the tire is being mounted on a wheel. Handling and transporting the locking ring is thereby simplified.

Each individual element 33, 34 corresponds to a sector representing between 5 and 60° of the locking ring when the latter is in place in the assembly for mounting the tire on the rim of the wheel. This small size of the individual elements 33, 34 will make it possible, when fitting the tire on a rim, to avoid any risk of damaging the polymeric insert 7, 27. This is because the locking ring 5, 25 which fits partially into a recess 6 on the rim has, particularly when the tire is being fitted, to move over the axially outer part of the recess 6, which has a slope. The position of the locking ring 5, 25 thus varies axially along the slope of the recess while the tire is being mounted and therefore has a changing radial position. An individual element corresponding to a sector representing between 5 and 60° is produced with a longitudinal curvature such that the individual element does not damage the polymeric insert irrespective of its position along the slope of the recess, and therefore of the radius of curvature at which it lies. When an individual element is made of metal, since the flexibility of metal is low, it advantageously corresponds to a sector representing less than 30°. The length of the individual element, that is to say the length of the sector to which it corresponds, will be defined according to the nature of the material used. Whatever the nature of the material of which the individual elements are made, these elements may also have axially-oriented and narrow cuts to make the said individual elements more flexible in the radial direction and thus minimize any risk of damaging the polymeric envelope.

The connecting element 35 which connects the individual elements 33, 34 together has means of elongation associated with an elastic restoring force. In FIG. 3, the element 35 is thus produced in the form of a component, preferably a metal component, fixed, at the points 36, 36', to each of the elements 33, 34, one on each side. Attachment is by any means known to those skilled in the art. Advantageously, the element 35 penetrates depressions 37, 37' in each of the elements 33, 34 and provided for this purpose at their ends. The element 35 further comprises an elongation system 38 with an elastic restoring force. This system 38 is, for example, as depicted in FIG. 3, produced using a moving part 39 that can move in the circumferential direction, the moving part being associated with the attachment point 36'. The movement of this part 39 makes it possible to lengthen the distance between the two elements 33, 34 and thus corresponds to a circumferential lengthening of the locking ring 5, 25. As it moves, the moving part 39 compresses a spring 40 which creates a restoring force and therefore gives the abovementioned circumferential elongation of the locking ring an elastic nature.

Figure 4:
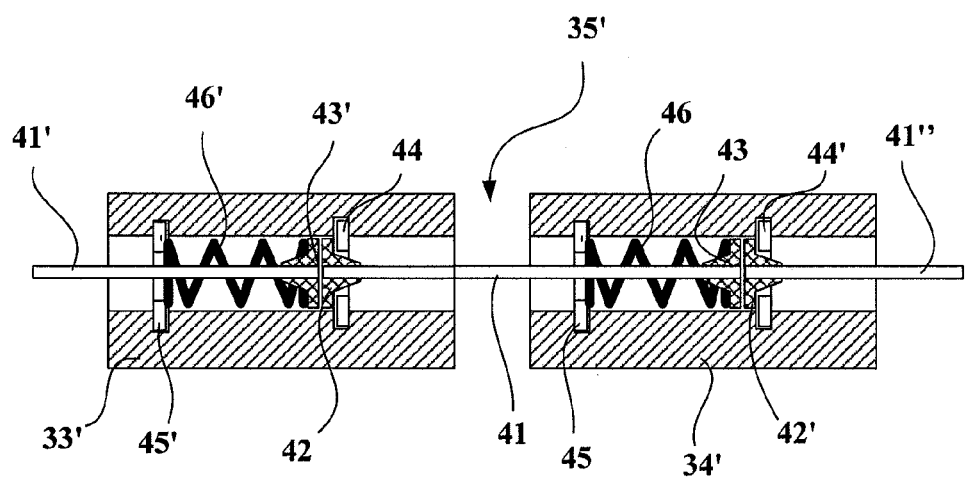
FIG. 4: a schematic depiction in circumferential section of an alternative embodiment of an element used to connect two individual elements.

FIG. 4 depicts, in circumferential section and as in the case of FIG. 3, part of a locking ring and, more specifically, two of the elements 33', 34' of which it is composed, the elements being connected by a connecting element 35'. The connecting element 35' comprises means of elongation associated with an elastic restoring force; it in particular consists of a cable 41, 41', 41", preferably a metal cable, of cable fixing elements 42, 43, 42', 43' and of blocking means 44, 45, 44', 45' for blocking the fixing elements in the individual elements 33', 34'. A spring 46, 46' is advantageously interposed between the fixing element 43, 43' and the blocking means 45, 45' in order to provide a restoring force in the event that the locking ring is circumferentially extended. The cable fixing elements 42, 43, 42', 43' are, for example, crimped onto the cables. The blocking means 44, 45, 44', 45' are any element known to those skilled in the art and are advantageously introduced from the outside of the individual elements 33', 34'; they have a shape such that they can retain the cable fixing elements 42, 43, 42', 43' while at the same time not impeding the passage of the cable 41, 41', 41". The individual elements 33', 34' have a duct passing through them in the circumferential direction, this duct for example being of circular cross section and having the same diameter as the fixing elements 43, 43', as depicted in FIG. 4.

Figure 5:
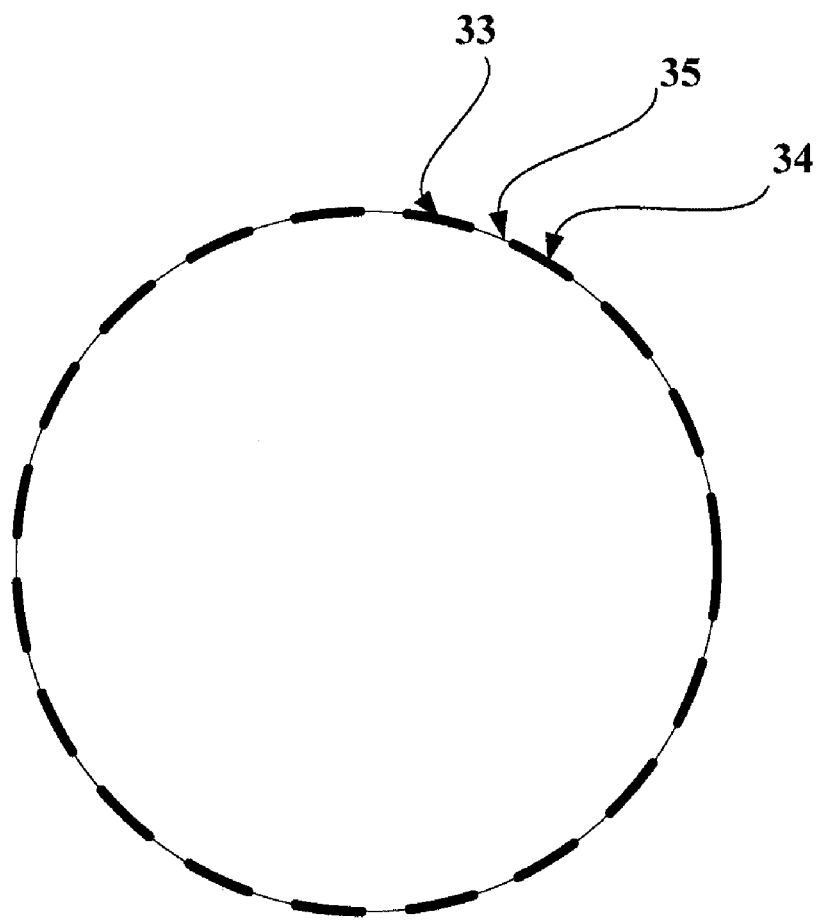
FIG. 5: a schematic depiction of the locking ring formed by several individual elements joined together.

Whatever the way in which the connecting element 35, 35' is embodied, such as the ways depicted by way of example in FIGS. 3 and 4, the same type of fixing element can be used for joining together all the individual elements that make up the locking ring. FIG. 5 shows multiple elements forming the locking ring. However, according to certain alternative forms of embodiment, the invention anticipates the final connection, that is to say the final assembly between two individual elements that forms the assembly into a continuous annular element, to be achieved using a simplified connecting element that possibly does not have any means of elongation associated with an elastic restoring force; this may, for example, involve a mechanical component of the bracket type which is inserted in slots made for that purpose on each end of the last two individual elements to be joined in order to form the locking ring.

The small size of the individual elements 33, 34, the fact that they are all advantageously chosen to be identical and that they are connected by connecting elements 35, 35' which are also all identical and, in particular, exhibit identical restoring forces, make it possible to obtain a uniform distribution of the pressure on the rim and therefore on the one hand optimize the mounting of the tire on the rim and, on the other hand, optimize the operation of the tire, particularly where the transmission of torque is concerned.

The invention as has just been described in particular with reference to the exemplary embodiments must not be interpreted as being restricted to these exemplary embodiments. The various elements that make up the assembly for mounting the tire may be embodied in different ways while still falling within the scope of the invention.

The rim may, for example, have a region of a diameter greater than its mean diameter, for example to leave space for a braking device. This larger-diameter region may advantageously be provided under the region where the axially inner bead of a tire is fitted. The mounting rings and possibly the locking rings which are intended to be associated with each of the beads of a tire may then have different meridian sections; it must then be understood that the region that forms the place where the beads of the tire are housed preferably remains similar for both mounting rings so that the tire remains of conventional and, in particular, symmetric, design.

The invention claimed is:

1. A locking system for mounting a mounting ring on a wheel rim, the mounting ring being configured to receive a bead of a tire in an assembly for mounting the tire on the wheel rim, and the wheel rim comprising a recess with a triangular section, wherein the locking system comprises:
a locking ring having an outer wall for receiving the mounting ring and having at least 25% of a maximum radial dimension lying within the triangular section of the recess; and
a polymeric insert positioned between and separating the locking ring and the wheel rim in the assembly in a radial direction of the wheel rim.

2. The locking system according to claim 1, wherein the locking ring is made of an incompressible material.

3. The locking system according to claim 2, wherein the locking ring is made of metal.

4. The locking system according to claim 1, wherein the polymeric insert extends in contact with at least a radially inner wall of the locking ring.

5. The locking system according to claim 4, wherein the polymeric insert extends along an axially inner side wall of the locking ring.

6. The locking system according to claim 5, wherein the polymeric insert includes an extension that is positioned radially and axially outside a radially outer end of the axially inner side wall of the locking ring.

7. The locking system according to claim 1, wherein the locking ring comprises several identical, individual elements joined together.

8. The locking system according to claim 7, wherein each of the individual elements corresponds to a sector of the locking ring when the locking ring is in place in the assembly for mounting the tire on the wheel rim.

9. The locking system according to claim 7, wherein the individual elements are joined together by additional elements comprising elongating means associated with an elastic restoring force.

10. The locking system according to claim 7 for mounting on a wheel rim, wherein a meridian section of the locking ring has a polygonal radially inner part with at least two sides substantially parallel to two sides of the triangular section of the recess.

11. The locking system according to claim 10, wherein the meridian section of the locking ring has a polygonal radially outer part with at least one tapered part, a generatrix of which makes an angle greater than 15° and smaller than 45° with respect to a direction of an axis of rotation.

12. The locking system according to claim 1, wherein the polymeric insert extends along an axially inner side wall of the locking ring.

13. The locking system according to claim 12, wherein the polymeric insert includes an extension that is positioned radially outside a radially outer end of the axially inner side wall of the locking ring.

14. The locking system according to claim 7, wherein each of the individual elements corresponds to a sector representing between 5° and 60° of the locking ring when the locking ring is in place in an assembly for mounting the tire on the wheel rim.

15. The locking system according to claim 10, wherein the meridian section of the locking ring has a polygonal radially outer part with at least one tapered part.

16. A mounting system for mounting a tire to a wheel rim comprising a recess with a triangular section, the mounting system comprising:
a mounting ring configured to receive a bead of the tire in an assembly for mounting the tire on the wheel rim,
a locking ring for retaining the mounting ring at a predetermined position on the wheel rim and having at least 25% of a maximum radial dimension lying within the triangular section of the recess; and
a polymeric insert positioned between and separating the locking ring and the wheel rim in the assembly in a radial direction of the wheel rim.

17. A vehicle wheel assembly comprising:
a wheel rim for mounting a tire to a vehicle and comprising a recess with a triangular section;
a mounting ring configured to receive a bead of the tire;
a locking ring for retaining the mounting ring at a predetermined position on the wheel rim and having at least 25% of a maximum radial dimension lying within the triangular section of the recess; and
a polymeric insert positioned between and separating the locking ring and the wheel rim in a radial direction of the wheel rim.

18. The vehicle wheel assembly according to claim 17, wherein the wheel rim has a recess formed on a radially outer surface for receiving the polymeric insert and part of the locking ring.

19. The vehicle wheel assembly according to claim 17, wherein the wheel rim has a recess formed in a radially outermost surface for receiving the polymeric insert and part of the locking ring.

20. The vehicle wheel assembly according to claim 19, wherein the polymeric insert extends radially from inside of the recess to cover part of the radially outermost surface of the wheel rim.

21. The vehicle wheel assembly according to claim 1, wherein the recess with the triangular section comprises two sides each forming an acute angle between 10° and 45° with a direction parallel to an axis of rotation of the tire.

* * * * *